United States Patent [19]
Hase et al.

[11] Patent Number: 5,062,011
[45] Date of Patent: Oct. 29, 1991

[54] ADDRESS MARK GENERATING METHOD AND ITS CIRCUIT IN A DATA MEMORY

[75] Inventors: Kenichi Hase, Fujisawa; Shyoichi Miyazawa; Ryutaro Horita, both of Yokohama; Shinichi Kojima, Takasaki; Akira Uragami, Takasaki; Takashi Watanabe, Takasaki; Yoshinori Yoshino, Takasaki, all of Japan

[73] Assignees: Hitachi, Ltd.; Hitachi Microcomputer Engineering Ltd., both of Tokyo, Japan

[21] Appl. No.: 327,757

[22] Filed: Mar. 23, 1989

[30] Foreign Application Priority Data

Mar. 26, 1988 [JP] Japan .................................. 63-72544

[51] Int. Cl.$^5$ .......................... G11B 5/09; G11B 20/14; G11B 20/16
[52] U.S. Cl. ........................................ 360/40; 360/48; 360/49; 341/59
[58] Field of Search ................ 360/40, 48, 49; 341/59, 341/68, 82; 371/57

[56] References Cited

U.S. PATENT DOCUMENTS

| | | | |
|---|---|---|---|
| 3,471,830 | 10/1969 | McRae et al. | 371/47.1 X |
| 3,689,899 | 9/1972 | Franaszek | 371/47.1 X |
| 4,697,167 | 9/1987 | O'Keeffe et al. | 360/40 X |
| 4,752,841 | 6/1988 | Syracuse et al. | 360/40 X |
| 4,757,406 | 7/1988 | Stewart et al. | 360/50 X |
| 4,819,153 | 4/1989 | Graham et al. | 360/75 X |

FOREIGN PATENT DOCUMENTS 121967 6/1987 Japan .

OTHER PUBLICATIONS

Adaptec, Inc. "2,7 RLL Encoder, Decoder", (AIC-270) 1982, 1987.

Primary Examiner—Roy N. Envall, Jr.
Assistant Examiner—Hung H. Bui
Attorney, Agent, or Firm—Fay, Sharpe, Beall, Fagan, Minnich & McKee

[57] ABSTRACT

When data are memorized in a 2-7 RLL code on a disc shaped memorizing medium using a sector format, as an address mark in each sector a 2-7 illegal pattern is used; a 1-byte data "8B" in an NRZ signal is converted into a 2-7 RLL code, and further it is modified into the 2-7 illegal pattern.

A disc controller in a disc memory inserts the 1-byte data "8B" into a specified position in an NRZ signal and transmits it to an encoder/decoder. In the encoder, the 1-byte data "8B" in an NRZ signal is detected, and a 2-7 illegal pattern is formed by reversing a specified bit of a 2-7 RLL code formed by converting the 1-byte data "8B", and the illegal pattern is sent to the read/write amplifier.

14 Claims, 6 Drawing Sheets

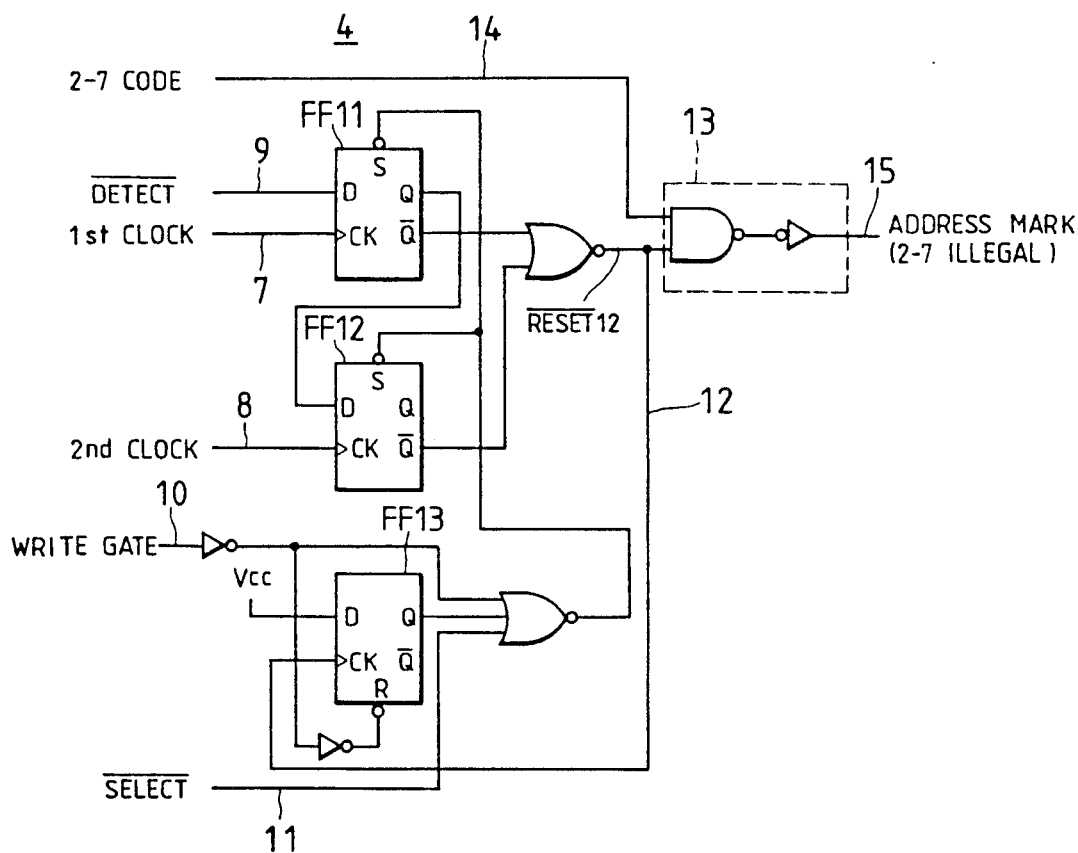
FIG. 3
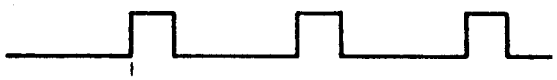
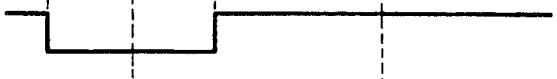
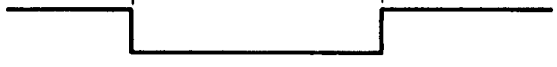

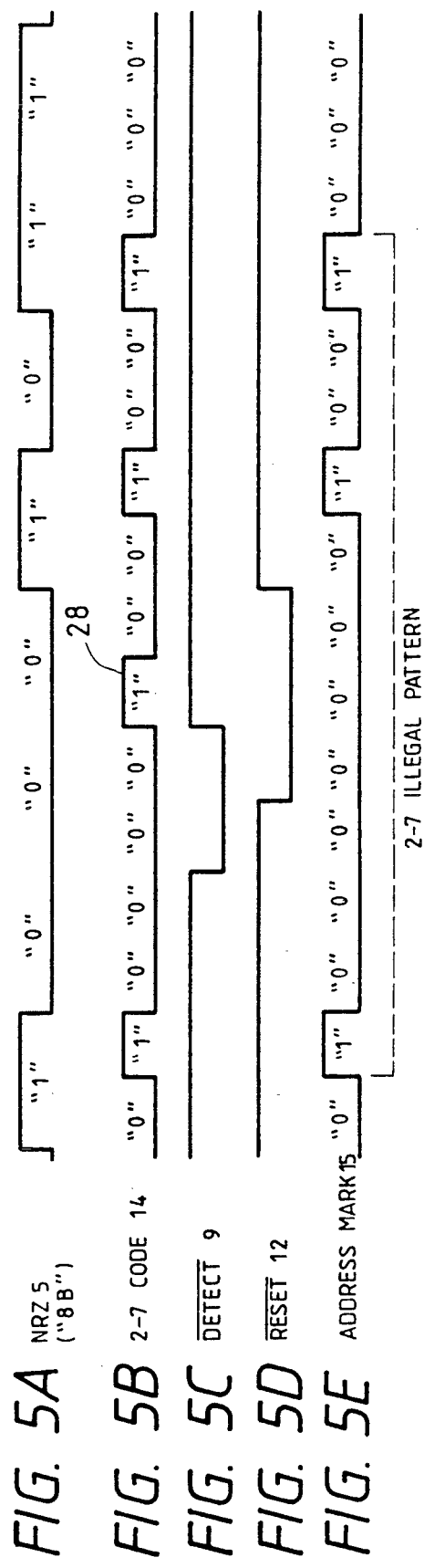

FIG. 8
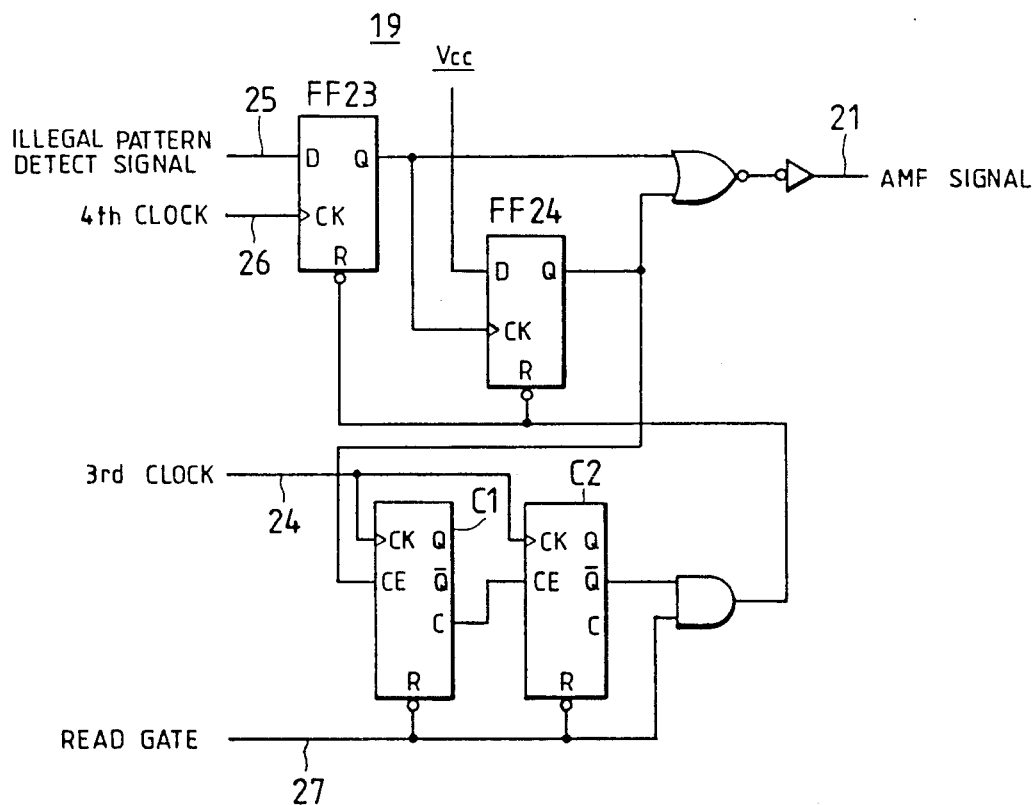
FIG. 9A  3rd CLOCK 24
FIG. 9B  4th CLOCK 26
FIG. 9C  ILLEGAL PATTERN DETECT SIGNAL 25
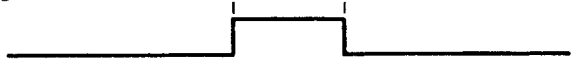
FIG. 9D  AMF SIGNAL 21
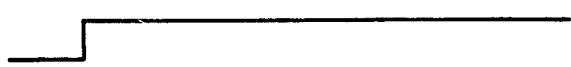
FIG. 9E  READ GATE 27

ADDRESS MARK GENERATING METHOD AND ITS CIRCUIT IN A DATA MEMORY

BACKGROUND OF THE INVENTION

The present invention relates to an address mark generating and detecting method, and its circuit in a data recording system. It relates to an address mark generating/detecting method and its circuit in a magnetic disc system using special recording signs of Run Length Limited Code. (Hereinafter referred to as RLLC.)

Recently 2-7 RLLC is beginning to be used widely as recording signs for a hard disc device. For example, refer to an official gazette in which a Japanese patent application, applied by the present applicant, was laid open to public inspection under a provisional publication No. 121967/87 by the Japanese Patent Office. As a recording format, a sector format is generally used. In a soft sector format, concentric or spiral tracks on a disc are divided into sectors, and each sector comprises ID fields and data fields. In each field an address signal is recorded including the information such as a track number, a sector number, etc. of the sector. The address signal is modulated by the same modulation system as that for general data, and so it is difficult to discriminate between an address signal and general data when data is read with a disc device. Because of this, in the area where an address signal is to be recorded a discrimination signal called an address mark is recorded to discriminate the recording of an address signal of a sector. For the address mark, a sign having a bit pattern different from that used for data or address, or a bit pattern which is out of the rule of the modulation system is used.

In the laid-open patent application referred to in the above, a not allowed byte pattern in 2-7 RLLC is used as an address mark. In AIC-270 (2,7 RLL encoder/decoder IC) by Adaptec Inc., an example of conventional systems, a 2-7 illegal pattern is used as an address mark in a sector format. The 2-7 illegal pattern means the one which satisfies the rule of 2-7 RLL code but the one which cannot exist normally.

Two methods can be considered to generate the 2-7 illegal pattern. In one method, a circuit which generates a 2-7 illegal pattern is provided independently, and when a control signal or a special input signal is detected the output of the illegal pattern generating circuit is made to interrupt into a data string. In another method, when a specified input pattern is detected a 2-7 illegal pattern is formed by modifying an encoded result of the specified pattern. In the former method, it is possible to constitute a pattern without futility, matching with the sector fields before and behind because a necessary pattern can be generated in an arbitrary position, but on the other side there are drawbacks such that a pattern generator is to be provided separately and preciseness is required in joining a data string and the specified pattern. In the latter method, only some extension of an encoder circuit is required and the specified pattern is generated using the data string itself, so that the problem above mentioned does not occur in an ordinary situation.

In an example of the latter, as in the case of AIC-270, an illegal pattern is generated from an NRZ (non-return to zero) input signal called "5EAX" (hexadecimal notation: X expresses an arbitrary 4 bit data) to form an address mark. In this case, a 2-7 illegal pattern is formed by substituting a bit of "1" in the data string, converted to 2-7 codes from "5EAX" in an NRZ signal, for "0". In this techniques, to form a 2-7 illegal pattern as an address mark "5EA", an NRZ signal of 1.5 byte, is to be detected, so that it takes time till the signal is detected and also the scale of the circuit becomes large. When a 4T signal ("1,000" in binary system) as a think pattern is used before an address mark, a futile pattern of 6 bits is written between the think pattern and the address mark, so that the position in which an address mark is to be written is shifted backward by that length. Therefore the timing of outputting an address mark detecting signal is also delayed, which can cause a trouble for disc control.

SUMMARY OF THE INVENTION

It is an object of the present invention to provide an address mark generating method and its generating circuit wherein futile patterns are eliminated and quick output of a detection signal of an address mark is made possible with a small scaled circuit.

It is a further object of the present invention to provide an address mark generating circuit and its detecting circuit wherein an address mark is generated from a 2-7 illegal pattern and its detection is made possible with a simple circuit structure.

It is yet another object of the present invention to provide an address mark generating method wherein a quick realization of the detection of an address mark is made possible.

In the present invention: to achieve the objects described above, in a data recording/playback system using a 2-7 RLL code as recording signs, 2-7 illegal pattern as an address mark in a sector format is formed from a 1-byte of data "8B" in an NRZ signal.

In the present invention: in a data memory using a 2-7 RLL code as recording signs, a generating circuit of a 2-7 illegal pattern as an address mark comprises a detecting means to detect the 1-byte of data "8B" in an NRZ signal, a converting means to convert the 1-byte of data "8B" in an NRZ signal into a 2-7 RLL code, and a modifying means to modify a 2-7 RLL code corresponding to the 1-byte of data "8B" in an NRZ signal according to the output of In the present invention: in a data memory using a 2-7 RLL code, a means which detects a 2-7 illegal pattern in the played back 2-7 RLL code data, and detects an address mark in the data is provided in a data playback section.

BRIEF DESCRIPTION OF THE DRAWINGS

FIG. 3 is a circuit diagram showing an example of a 2-7 illegal pattern generating circuit of the present invention;

FIGS. 4A-4F are timing charts of a 2-7 illegal pattern generating circuit shown in FIG. 3;

FIGS. 5A-5E are signal timing charts starting from an "8B" pattern till an address mark is generated to explain the functions of the present invention;

FIG. 7 and FIG. 8 are circuit diagrams showing examples of a principal part of what is shown in FIG. 6;

FIGS. 9A-9E are timing charts of individual sections in the example shown in FIG. 8;

DETAILED DESCRIPTION OF THE PREFERRED EMBODIMENTS

Figure 1:
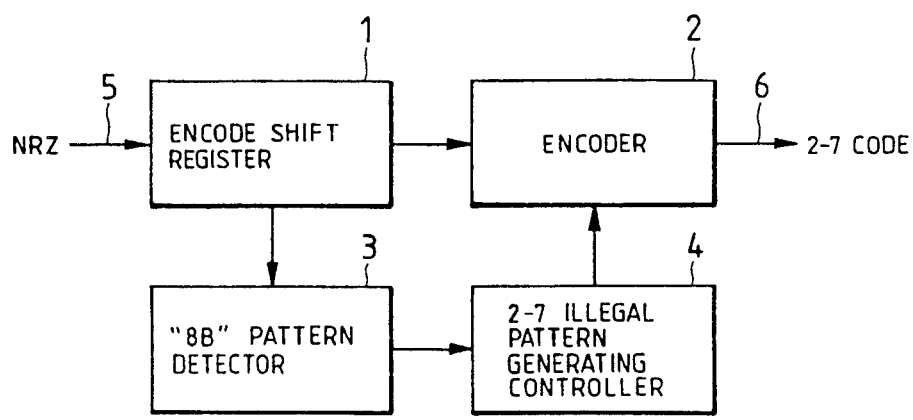
FIG. 1 is a block diagram showing the configuration of an 2-7 encoder including an address mark generating circuit of the present invention.

Following are explantions referring to the drawings of an embodiment of the present invention. FIG. 1 shows a configuration of a 2-7 encoder having a 2-7 illegal pattern generating circuit. The encoder comprises an encoding shift register 1 which temporarily stores an NRZ signal 5 to be input; an encoder 2 which converts the NRZ signal 5 into a 2-7 code; an "8B" pattern detecting circuit 3 which detects an "8B" pattern out of the encoding shift register 1 and outputs an "8B" pattern detection signal; a 2-7 illegal pattern generation control circuit 4 which generates a control signal for forming a 2-7 illegal pattern.

Figure 2:
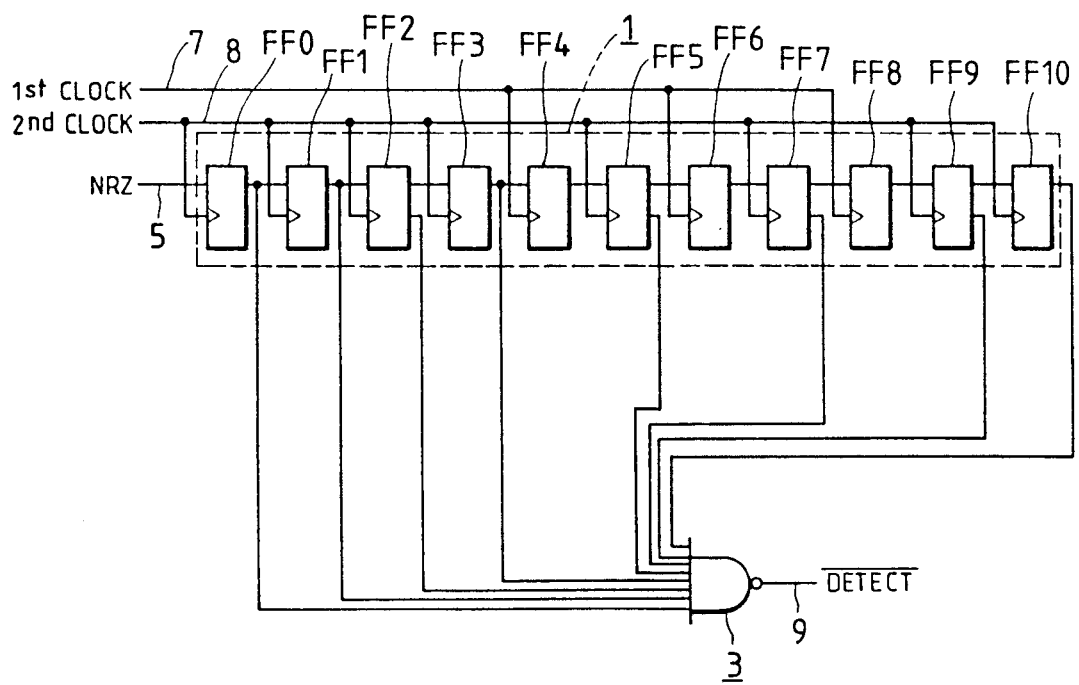
FIG. 2 is a circuit diagram showing an example of a shift register and a detecting circuit of an "8B" pattern of the present invention.

Referring to FIGS. 5A-5E a simple explanation is given as shown below on the functions of the equipment having the configuration mentioned above: it converts an "8B" pattern in an NRZ signal 5 into a 2-7 code 14; it eliminates a futile bit 28 in the 2-7 code 14; it generates a 2-7 illegal pattern and makes it an address mark 15. An explanation of operation of the equipment is given as shown below referring to FIG. 2, FIG. 3 and FIG. 4. FIG. 2 shows a concrete example of an encoding shift register 1 and an "8B" pattern detecting circuit 3. An NRZ signal 5, and a first clock pulse 7 and a second clock pulse 8 (refer to FIGS. 4A, 4B) which are in synchronization with the NRZ signal 5 are added to the encoding shift register 1. The NRZ signal 5 sent from a disc controller (It is not shown in the drawing.) is input in series to the encoding shift register 1 with the second clock pulse 8. The encoding shift register 1 is formed, as shown in FIG. 2, with 11 stages of flip-flop circuits (FF 0-10), and 6 stages of them (FF 3-FF 8) having the data necessary to the encoder 2, and commonly having the data necessary to the "8B" pattern detecting circuit 3. Therefore in the part of FF 3-FF 8, FF's 4, 6 and 8 are contained which are latched by the first clock pulse synchronizing with the second clock pulse but differing in phase by pi. The output of these FF's 4, 6 and 8 are not input to "8B" pattern detecting circuit 3. The "8B" pattern detecting circuit 3 is always referring to 8 bits of the NRZ signal 5 which is stored in the encoding shift register 1, and when the 8 bit data becomes "$\overline{10001011}$", "8B" pattern detection signal ($\overline{\text{Detect}}$) 9 is output by the length equivalent to one bit length of the NRZ signal (Refer to FIG. 4C.). The "8B" pattern detecting circuit 3 comprises a NAND circuit to which Q output of FF's 0, 1, 3 and 10, and $\overline{Q}$ output of FF's 2, 5, 7 and 9 are input.

On the reception of an "8B" pattern detection signal 9, 2-7 illegal pattern generation control circuit 4 generates a bit-erasing signal ($\overline{\text{Reset}}$) 12 (FIG. 4D), a control signal for forming a 2-7 illegal pattern. FIG. 3 shows a concrete example of the 2-7 illegal pattern generation control circuit 4. In FIG. 3, the "8B" pattern detection signal 9 is latched by a flip-flop (FF) 11 with the first clock pulse 7 and is successively latched by the next stage flip-flop (FF) 12 with the second clock pulse 8. The bit-erasing signal 12 (FIG. 4D) is formed by NORing the, $\overline{Q}$ outputs of FF's 11 and 12. As for its timing, as shown in FIG. 4, a bit-erasing signal 12 is output, with a margin of 1 bit each in front and rear, for erasing a futile bit 28 in an internal signal (2-7 code) 14 of the encoder.

In FIG. 3, FF 13 at the bottom is to control the operation of 2-7 illegal pattern generation control circuit 4, and as its control signal a write gate signal 10 is input. When the write gate signal 10 is "L", 2-7 illegal pattern generation control circuit 4 is in the state of reset, and a bit-erasing signal is not output. When the write gate signal is changed to "H" from "L" a resetting state is released and a bit-erasing signal 12 is in a waiting state for output. When the "8B" pattern detection signal 9 is sent from the "8B" pattern detecting circuit 3, 2-7 pattern generation control circuit 4 outputs a bit-erasing signal 12 and at the same time with the rising edge of the signal 12 sets a flip-flop (FF) 13. By this operation address mark generation control circuit 4 is made to be in a reset state again and the bit-erasing signal is not output. This state is maintained until a rising edge of a write gate signal 10 is detected again.

A switching signal ($\overline{\text{Select}}$) 11 is also a control signal for the 2-7 illegal pattern generation control circuit 4; when this switching signal 11 becomes "H" the 2-7 illegal pattern generation control circuit 4 does not work. A bit-erasing signal 12 is input to a circuit 13, which constitute a part of the encoder 2, it is compounded with an internal signal (2-7 code) 14 of the encoder and it erases a futile bit 28 (FIG. 4E) and forms an address mark 15 (FIG. 4F), a 2-7 illegal pattern, and outputs it. These processes are clearly shown in FIGS. 5A-5E as previously mentioned. The data "8B" (10001011) in the NRZ signal 5 (FIG. 5A) becomes "01000010010010000" in the encoder 2 compounded with a 2-7 code 14 (FIG. 5B), on the other hand the "8B" pattern detection signal 9 and a bit-erasing signal 12 are generated at a timing as shown in FIGS. 5C, 5D, so that a futile bit 28, 7th bit from the front, is erased and an address mark (2-7 illegal pattern) 15 (FIG. 5E), is formed.

There is actually a time lag corresponding to an encoding time in the NRZ signal 5 and he internal signal (2-7 code) 14 which are shown in FIGS. 5A, 5B. The timings of internal signals following the signal (2-7 code) 14 of the encoder 2 as shown in FIGS. 5B-5E are shown in these drawings.

By forming an address mark (2-7 illegal pattern) 15 with the arrangement as shown above, the desired circuit can be realized with a small scaled circuit owing to the common use of part of the circuit with the encoder 2, etc. The detection of an "8B", a 1-byte NRZ signal, is good enough for forming an address mark of a 2-7 illegal pattern, so that the necessary time for detection is shortened. This is a great merit for a hard disc controller. Following are explanations of an example of an address mark detecting circuit suitable for an address mark generating method of the present invention referring to FIG. 6, FIG. 7, FIG. 8 and FIG. 9.

Figure 6:
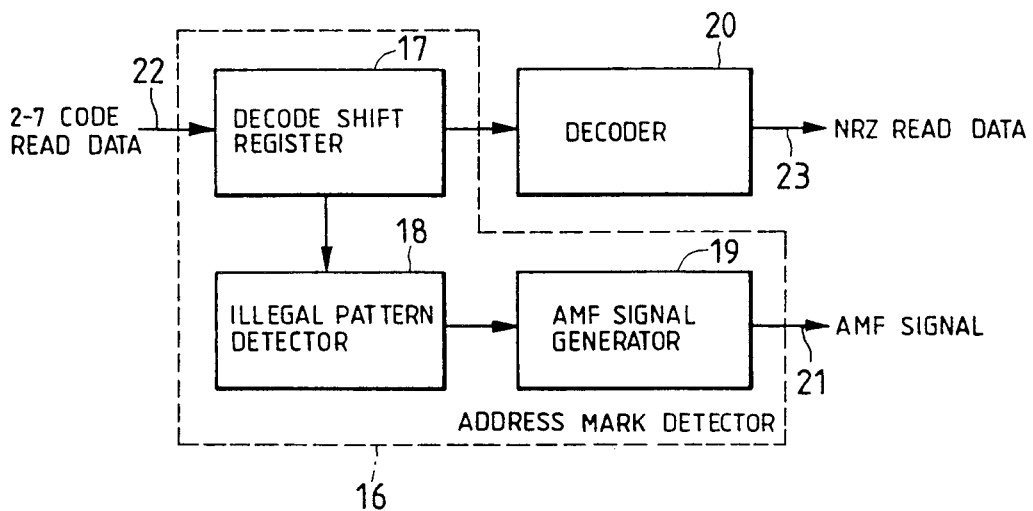
FIG. 6 is a circuit diagram showing an example of an address mark detecting circuit of the present invention.

FIG. 6 is a block diagram showing a configuration of an address mark detecting circuit 16. It comprises a decoding shift register 17 which temporarily stores read out 2-7 code read data 22 an illegal pattern detecting circuit 18 which detects a 2-7 illegal pattern from the data in the decoding shift register 17, and an AMF signal generating circuit 19 which generates an address mark detection signal (AMF) 21 by receiving the output of the detecting circuit 18. The decoding shift register 17 is commonly used with a decoder 20 which converts the 2-7 code read data 22 into an NRZ read data 23.

Figure 7:
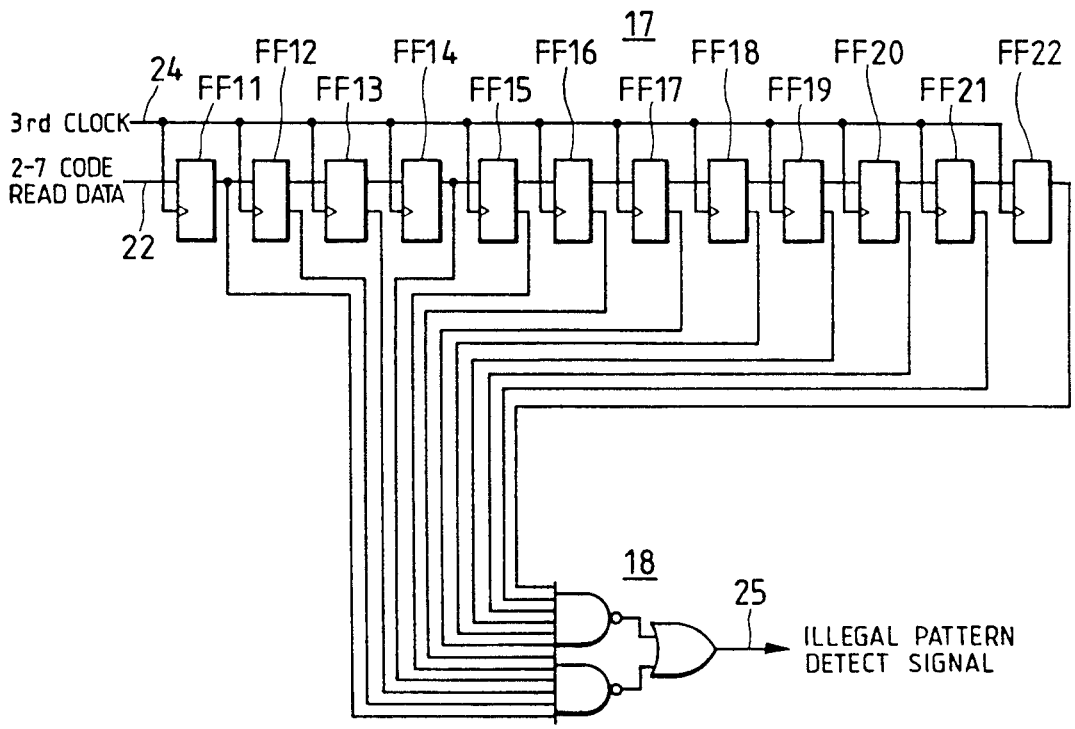

FIG. 7 shows the circuit construction of an example of the decoding shift register 17 and the illegal pattern detecting circuit 18 of the present invention. The 2-7 code read data 22, which are read out, are taken in series from FF 11 to FF 22 with a third clock pulse 24. When the internal states of FF 11 to FF 22 are changed to "100100000001", the illegal pattern detecting circuit 18 outputs a pulse corresponding to one bit of 2-7 code as an illegal pattern detection signal 25. The illegal pattern detecting circuit 18 comprises two NAND circuits and an OR circuit. Q outputs of FF's 11, 14 and $\overline{Q}$ outputs of FF's 12, 13, 15, 16 are input to a NAND circuit, and Q output of FF 22 and $\overline{Q}$ outputs of FF's 17, 18, 19, 20, 21 are input to another NAND circuit, and the outputs of these two NAND circuits are input to the OR circuit.

FIG. 8 shows an internal circuit of an AMF signal generating circuit 19, and FIGS. 9A-9E are timing charts of the AMF signal generating circuit 19. As shown in FIG. 8, FF's 23, 24, and 1-bit counters C1, C2 are main constituent components of the AMF signal generating circuit 19.

Following are explanations of operation.

When a read gate signal 27, which controls readout operation, becomes active ("H") (FIG. 9E) and an illegal pattern detection signal 25 (FIG. 9C) is output, the illegal pattern detection signal 25 is latched in FF 23 with a 4th clock pulse 26 (FIG. 9B) which is synchronized with a 3rd clock pulse 24 but is opposite in the phase. The output of FF 23 makes the AMF signal 21 change to "H" through two stages of gates (FIG. 9D) and at the same time activates FF 24; then the output of FF 24 activates 1-bit counters C1, C2. When the count up by a 3rd clock pulse 24 is completed, and the output of C2 ($\overline{Q}$) is changed back to "L", FF 23 and FF 24 are reset and the AMF signal becomes "L". This reset condition continues until the read gate signal is changed from "L" to "H" again.

If an address mark detecting circuit is realized in the arrangement as shown above, the address mark can be detected by the readout of a 2-7 illegal pattern formed in the address mark generating circuit.

Figure 10:
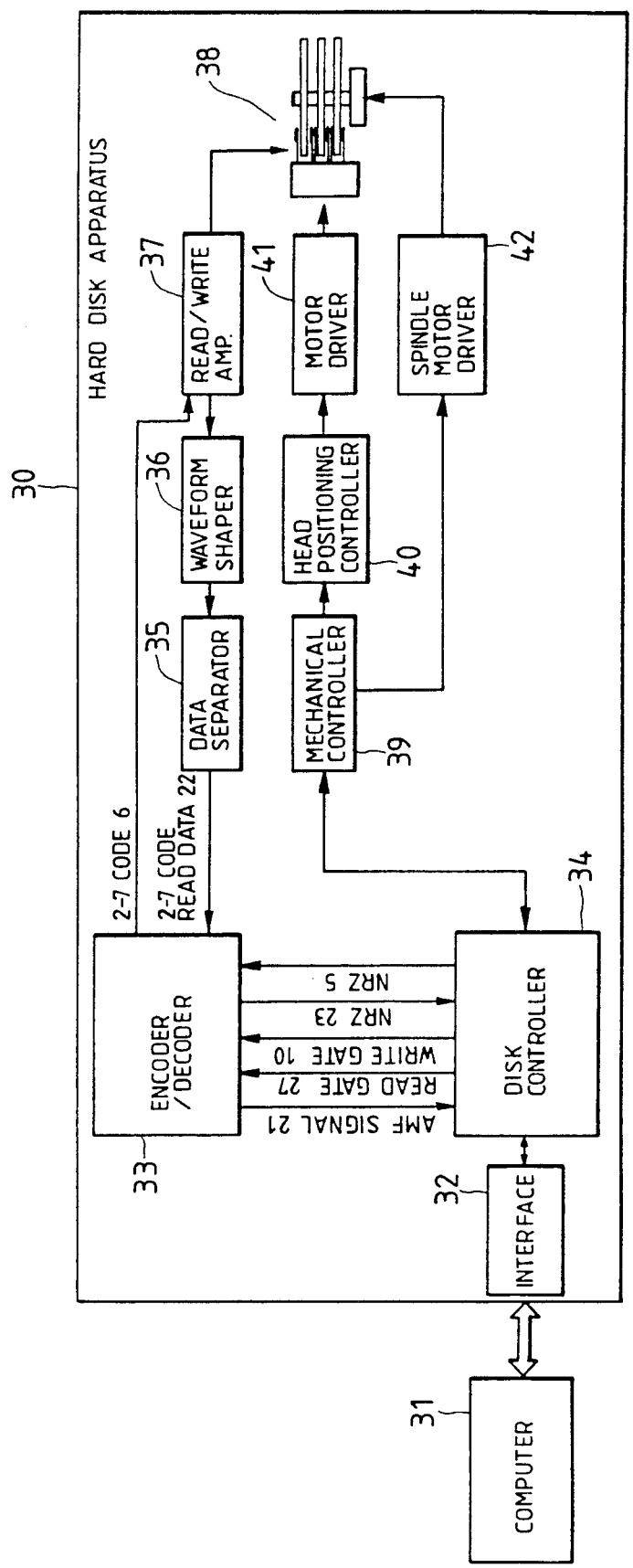
FIG. 10 is a block diagram showing an outline of a configuration of a magnetic disc device to which the present invention is to be applied.

FIG. 10 shows a configuration of a magnetic disc device to which a generating/detecting method of the present invention is applied. In the drawing, part number 30 is a hard disc device which memorizes the data from a computer. The hard disc device has an ordinary configuration. The data or instructions from a computer are sent to a disc controller 34 through an interface 32. An encoder/decoder 33 is shown in FIG. 1, and FIG. 6 is provided and exchanges of data are performed between the encoder/decoder 33 and a disc controller 34. The data exchanged includes such ones as the NRZ signal 5, the NRZ read data 23, the AMF signal 21, the read gate 27, the write gate 10, etc. The 2-7 code 6 generated in the encoder/decoder is sent to a write-/read head 38 through a read/write amplifier 37, and the data is written in a specified track on a magnetic disc. In the case of playback, a signal read out with the head is sent to the encoder/decoder as the 2-7 code read data 22 through the read/write amplifier 37, a waveform shaper 36, and a data separator 35. A mechanical controller 39, a head positioning controller 40, a motor driver 41 and a spindle motor driver 42 constitute an ordinary control system of a disc device.

The disc controller 34 has an ordinary configuration, data sent from a computer is temporarily stored in a buffer, and after some processes are done, such as the insertion of a 1-byte data "8B" in the NRZ signal into the part of an address mark, the data is sent out to the encoder/decoder as the NRZ signal 5. The sequence of these processes is, as is generally known, executed by a central processing part in the disc controller 34. The memorizing means such as ROM (read only memory) or RAM (random access memory) are included in the disc controller 34, and the 1-byte data "8B" in the NRZ signal shall be set in these memories in the case of an initial setting etc.

According to the present invention, an "8B" pattern in the NRZ signal is detected and a bit of "1" in a certain position, produced as a result of encoding of an "8B", is changed to "0", as a futile bit to form a 2-7 illegal pattern, so that an address mark which makes a quick output of an address mark detection signal possible, eliminating a futile pattern with a small scale circuit, can be written in a disc memory.

What is claimed is:

1. A data recording method using a 2-7 RLL (Run Length Limited) code as a recording sign on a recording medium comprising the steps of:
   detecting 1-byte of data comprising a hexadecimal notation "8B" arranged in a NRZ (Non-Return to Zero) signal to be input;
   converting said 1-byte of data "8B" into a 2-17 RLL code;
   modifying said 2-7 RLL code, corresponding to said 1-byte of data "8B", into a 2-7 illegal pattern, wherein said 2-7 illegal pattern satisfies rules of said 2-7 RLL code but which does not normally exist; and
   recording said 2-7 illegal pattern on the recording medium as an address mark.

2. The data recording method according to claim 1, wherein:
   said modifying step further includes, eliminating a futile bit from said 2-7 RLL code, where said 2-7 code corresponds to said 1-byte of data "8B", the 2-7 RLL code thereby being modified into said 2-7 illegal pattern.

3. The data recording method according to claim 1, further including:
   an inserting step wherein said 1-byte of data "8B" is inserted into a specific position of said NRZ signal before said NRZ signal is input.

4. An address mark generating device of a data memory which, with the use of a 2-7 RLL (Run Length Limited) code, records and plays back data on a disc type recording medium of a sector format the device comprising:
   a means for detecting 1-byte of data comprising a hexadecimal notation "8B" located in a NRZ (Non-Return to Zero) signal to be input;
   a means responsive to said detecting means for converting the 1-byte of data "8B" in said NR signal into a 2-7 RLL code;
   a means for modifying said 2-7 RLL code, where said 2-7 RLL code corresponds to the 1-byte of data "8B" in said NRZ signal converted by said converting means according to the output of said detecting means, into a 2-7 illegal pattern, wherein said 2-7 illegal pattern satisfies rules of said 2-7 RLL code but which does not normally exist; and
   a means responsive to said modifying means for recording said 2-7 illegal pattern on the disc type recording medium as an address mark.

5. The address mark generating device according to claim 4, wherein: said modifying means forms said 2-7 illegal pattern by reversing a 7th bit of said 2-7 RLL code corresponding to said 1-byte of data "8B".

6. The address mark generating device according to claim 5 further comprising:
   an inserting means for inserting said 1-byte of data "8B" into a position of an address mark in said RNZ signal, where said inserting means is connected to a former stage of said detecting means.

7. A magnetic disc device wherein the data of 2-7 RLL (Run Length Limited) code are recorded in an played back from each track on a magnetic disc in sector format the device comprising:
   a sending means for sending out a NRZ (Non-Return to Zero) signal by inserting 1-byte of data comprising a hexadecimal notation "8B" in a part where an address mark of each sector of said magnetic disc is to be positioned;
   a converting means for converting said NRZ signal into a 2-7 RLL code;
   a detecting means for detecting said 1-byte of data "8B" from said NRZ signal, said detecting means being part of said converting means;
   a modifying means for modifying said 2-7 RLL code, corresponding to said 1-byte of data "8B" converted with said converting means according to an output of said detecting means, into a 2-7 illegal pattern; and
   a recording means for recording said 2-7 RLL code having said 2-7 illegal pattern in a specified position on said magnetic disc.

8. The magnetic disc device according to claim 7, further comprising:
   a playback means to playback said 2-7 RLL code from said magnetic disc; and
   a generating means to generate an address mark detection signal, by detecting said 2-7 illegal pattern from said 2-7 RL1 code played back with said playback means.

9. The magnetic disc device according to claim 7, wherein: said modifyign means forms said 2-7 illegal pattern by eliminating said futile bit from said 2-7 RLL code corresponding to said 1-byte of data "8B".

10. The magnetic disc device according to claim 7, wherein: said modifying means forms said 2-7 illegal pattern by reversing a 7th bit of said 2-7 RL1 code corresponding to said 1-byte of data "8B".

11. An apparatus adapted for generating and detecting address marks in an associated magnetic disc system, said apparatus comprising:
   an encoding shift register for temporarily storing an incoming signal adapted to be input into the associated magnetic disc system;
   an encoder responsive to said encoding shift register for converting the incoming signal into a desired code;
   a byte pattern detector for detecting a predetermined byte pattern comprising a hexadecimal notation "8B", delivered from said encoding shift register, and for outputting a detected byte pattern signal; and
   an illegal pattern generating controller responsive to said byte pattern detector for generating a control signal for forming an illegal pattern, after said illegal pattern generating controller receives the detected byte pattern signal.

12. The apparatus for generating and detecting address marks in the associated magnetic disc system according to claim 11, wherein said address marks designate track and sector positions of the associated magnetic disc system memory.

13. The apparatus for generating and detecting address marks in the associated magnetic disc system according to claim 11, further including an address mark detection means wherein said address mark detection means includes:
   a decoding shift register for temporarily storing data previously encoded;
   an illegal pattern detector for detecting an illegal pattern from the data decoded by said decoding shift register;
   an address mark detector signal circuit for generating an address mark detector signal in response to reception of the illegal pattern detector's output;
   a decoder for decoding the encoded data into a form similar to which it was upon entry into the system.

14. The apparatus for generating and detecting address marks in the associated magnetic disc system according to claim 11, wherein forming of the illegal pattern includes at least one of eliminating and reversing a futile bit.

* * * * *

UNITED STATES PATENT AND TRADEMARK OFFICE
CERTIFICATE OF CORRECTION

PATENT NO. : 5,062,011
DATED : October 29, 1991
INVENTOR(S) : Kenichi Hase, et al.

It is certified that error appears in the above-identified patent and that said Letters Patent is hereby corrected as shown below:

Claim 1, column 6, line 27, delete "2-17" and insert therefor --2-7--.

Claim 4, column 6, line 57, delete "NR" and insert therefor --NRZ--.

Claim 7, column 7, line 12, delete "an" and insert therefor --and--.

Claim 8, column 7, line 39, delete "RL1" and insert therefor --RLL--.

Claim 9, column 7, line 42, delete "modifyign" and insert therefor --modifying--.

Claim 10, column 8, line 1, delete "RL1" and insert therefor --RLL--.

Signed and Sealed this

Twenty-third Day of March, 1993

*Attest:*

STEPHEN G. KUNIN

*Attesting Officer*  *Acting Commissioner of Patents and Trademarks*